US009863794B2

(12) United States Patent
Masuda et al.

(10) Patent No.: US 9,863,794 B2
(45) Date of Patent: Jan. 9, 2018

(54) DISPLAY DEVICE

(71) Applicant: NIPPON SEIKI CO., LTD., Niigata (JP)

(72) Inventors: Hideki Masuda, Niigata (JP); Yuji Okada, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 169 days.

(21) Appl. No.: 14/769,059

(22) PCT Filed: Feb. 14, 2014

(86) PCT No.: PCT/JP2014/053491
§ 371 (c)(1),
(2) Date: Aug. 19, 2015

(87) PCT Pub. No.: WO2014/129401
PCT Pub. Date: Aug. 28, 2014

(65) Prior Publication Data
US 2016/0011021 A1 Jan. 14, 2016

(30) Foreign Application Priority Data
Feb. 22, 2013 (JP) .................................. 2013-033701

(51) Int. Cl.
*G01D 13/28* (2006.01)
*G01D 11/28* (2006.01)
(Continued)

(52) U.S. Cl.
CPC ............. *G01D 13/28* (2013.01); *B60K 37/02* (2013.01); *G01D 7/04* (2013.01); *G01D 11/28* (2013.01);
(Continued)

(58) Field of Classification Search
CPC .......... G01D 13/28; G01D 7/04; G01D 13/04; G01D 7/00; G01D 11/28;
(Continued)

(56) References Cited

U.S. PATENT DOCUMENTS 7,743,726 B2 * 6/2010 Yoshida ................. B60K 37/02
116/287
2001/0001565 A1 5/2001 Brandt et al.
(Continued)

FOREIGN PATENT DOCUMENTS

JP 11-258009 A 9/1999
JP 2007-121728 A 5/2007
(Continued)

OTHER PUBLICATIONS

International Search Report PCT/JP2014/053491 dated Apr. 8, 2014 with English translation.

*Primary Examiner* — R. A. Smith
*Assistant Examiner* — Tania Courson
(74) *Attorney, Agent, or Firm* — McDermott Will & Emery LLP

(57) ABSTRACT

Provided is a display device for which the display content is easily viewed. A display device comprises: a cover plate having a gauge section on which an index is represented and a light transmitting portion that transmits light from the back; a needle that rotates on the gauge section and points to the index; and a display that is disposed behind the light transmitting portion and shows an image via the light transmitting portion. When viewing the display device in planar view, the gauge section has an overlapping region that overlaps with a portion of a display section where the display emits light, and the cover plate adheres to the display (Continued)

by a transparent resin that is between the cover plate and the display and spans at least the region of the light transmitting portion.

7 Claims, 5 Drawing Sheets

(51) Int. Cl.
*G01D 7/04* (2006.01)
*B60K 37/02* (2006.01)
*G01D 13/04* (2006.01)
*G02F 1/1339* (2006.01)
*B60K 35/00* (2006.01)
*G01D 7/00* (2006.01)
*G02F 1/1333* (2006.01)

(52) U.S. Cl.
CPC ............ *G01D 13/04* (2013.01); *G02F 1/1339* (2013.01); *B60K 35/00* (2013.01); *B60K 2350/1064* (2013.01); *B60K 2350/2086* (2013.01); *B60K 2350/2091* (2013.01); *B60K 2350/402* (2013.01); *G01D 7/00* (2013.01); *G02F 2001/133331* (2013.01)

(58) Field of Classification Search
CPC ...... B60K 2350/1064; B60K 2350/402; B60K 37/02; B60K 2350/2086; B60K 2350/2091; B60K 35/00; G02F 1/1339

USPC ....... 116/62.4, 284, 286, 288, 290, 292, 294
See application file for complete search history.

(56) References Cited

U.S. PATENT DOCUMENTS

| | | | | |
|---|---|---|---|---|
| 2006/0219155 | A1* | 10/2006 | Honma | B60K 37/02 116/288 |
| 2010/0326348 | A1* | 12/2010 | Oguro | B60K 37/02 116/334 |
| 2012/0048177 | A1* | 3/2012 | Tomono | G01D 13/28 116/288 |
| 2012/0250280 | A1* | 10/2012 | Sano | B60K 35/00 361/760 |
| 2014/0233208 | A1* | 8/2014 | Hamada | B60K 37/02 362/23.17 |
| 2015/0321600 | A1* | 11/2015 | Webb | G01D 13/28 362/511 |
| 2016/0161303 | A1* | 6/2016 | Otani | B60K 35/00 116/288 |
| 2016/0221440 | A1* | 8/2016 | Tane | B60K 35/00 |
| 2016/0238418 | A1* | 8/2016 | Fujita | B60K 37/02 |

FOREIGN PATENT DOCUMENTS

| | | |
|---|---|---|
| JP | 2009-204390 A | 9/2009 |
| JP | 2010-0127832 A | 6/2010 |
| JP | 2011-242144 A | 12/2011 |
| JP | 2012-032209 A | 2/2012 |

* cited by examiner (a)

(b)

DISPLAY DEVICE

CROSS-REFERENCE TO RELATED APPLICATIONS

This application is the U.S. National Phase of PCT/JP2014/053491 dated Feb. 14, 2014 which claims priority to Japanese Patent Application No. 2013-033701 filed Feb. 22, 2013. The subject matter of each is incorporated herein by reference in entirety.

TECHNICAL FIELD

The present invention relates to a display device that is mounted on a vehicle or the like for displaying various information.

BACKGROUND ART

Various devices have been developed and commercialized as a display device that is mounted on a vehicle or the like for displaying information such as vehicle status and driving situation. An example of such a display device has been disclosed in Patent Literature 1.

The display device has two ring-shaped meters, and has a display region capable of displaying various images between these two meters. A meter frame partitioning each meter is notched in the display region. Impression as a whole meter can be changed by displaying a notched meter frame in the display region by a connection image.

CITATION LIST

Patent Literature

Patent Literature 1: Japanese Unexamined Patent Application Publication No. 2012-32209

SUMMARY OF THE INVENTION

Problems to be Solved by the Invention

The display device disclosed in Patent Literature 1 displays a notched meter frame in a display region by a connection image. However, this has a problem that a sense of unity is poor between the connection image in the display region and the meter frame, and a step is visible when diagonally viewing the display. As a method of solving the problem, it is considerable to mold integrally the meter frame and the connection image in the display region by a transparent member (the meter frame is formed by painting a transparent member), and connect them steplessly. However, as an air layer exists between the display device and the transparent material, there arises a problem that external light reflection occurs on the surface of the transparent member, and display in the display region becomes difficult to see.

The present invention has been made to solve the above problems. Accordingly, it is an object of the present invention to provide a display device easy to view displayed content.

Solution to Problem

To achieve the above object, according to a feature of the present invention, a display device, comprising: a pointer, a cover plate having a gauge section, on which an index pointed by the pointer is expressed, the gauge section configuring a pointer-type instrument together with the pointer and a light-transmitting portion that transmits light, and a display, which is disposed behind the light-transmitting portion, and has a display region for display an image through the light-transmitting portion, wherein the gauge section has an overlapping region that laps over a part of the display region, when viewing in plan, and the light-transmitting portion and the display region of the display are in close contact through a transparent resin.

Effect of the Invention

According to the present invention, it is possible to provide a display device easy to recognize displayed content.

MODE FOR CARRYING OUT THE INVENTION

Figure 1:
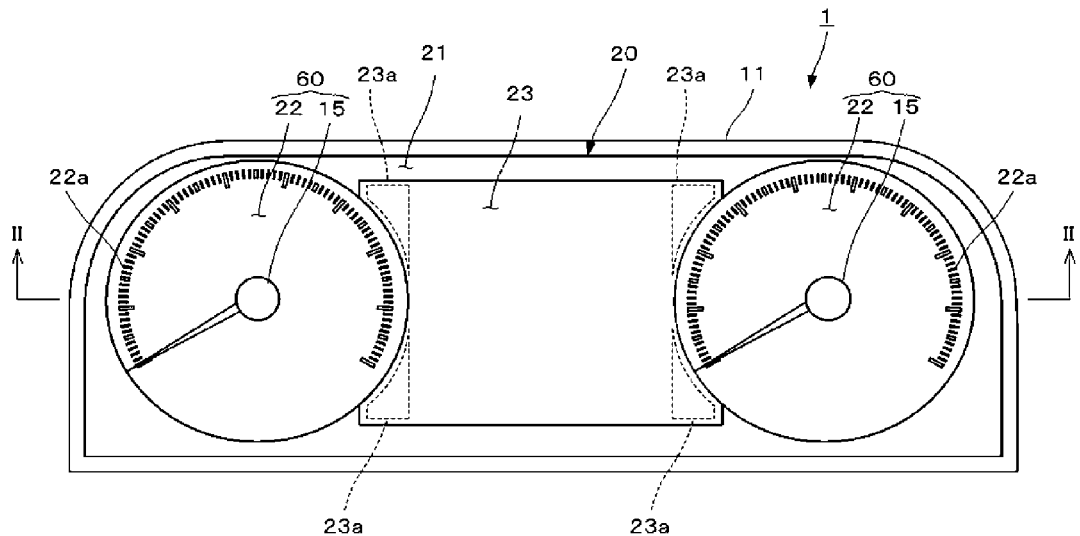
FIG. 1 is a plan view of a display device according to a first embodiment of the present invention.

Hereinafter, a display device according to the present invention will be described with reference to the drawings. FIG. 1 shows a plan view of a display device according to a first embodiment of the invention. As shown in the figure, a display device 1 has two ring-shaped index display parts 22 formed on a cover plate 20. Each ring-shaped index display part 22 is formed by expressing or printing an index 22a having a scale or the like for displaying vehicle status and traveling situation, and a contour defining a pointer-type instrument, on a transparent cover plate 20. A driver can check vehicle status and driving situation by visually recognizing the ring-shaped index display part 22 and a position pointed by a pointer 15 that rotates around the center of the ring-shaped index display part 22 (i.e., by viewing the position of the index 22a pointed by the pointer 15). The ring-shaped index display part 22 defines a pointer-type instrument by its contour. In other words, in the embodiment, the ring-shaped index display part 22 and the pointer 15 constitute a gauge section 60 of a pointer-type instrument. The outer shape of the gauge section 60 may be an approximately circular shape. An approximately circular shape is an elliptical shape, and a circular shape of the embodiment or a shape close to a circular shape. The contour of the gauge section 60 may not be specifically drawn on the cover plate 20. In such a case, the gauge section 60 is assumed to be formed by an index and its peripheral region (e.g., a non-transparent region painted in a predetermined color). A light-transmitting portion 23 that transmits light from behind is formed between two ring-shaped index display parts 22 of the cover plate 20. Through the light-transmitting portion 23, a driver can visually recognize an image that is displayed by a display 30 described later.

Figure 2:
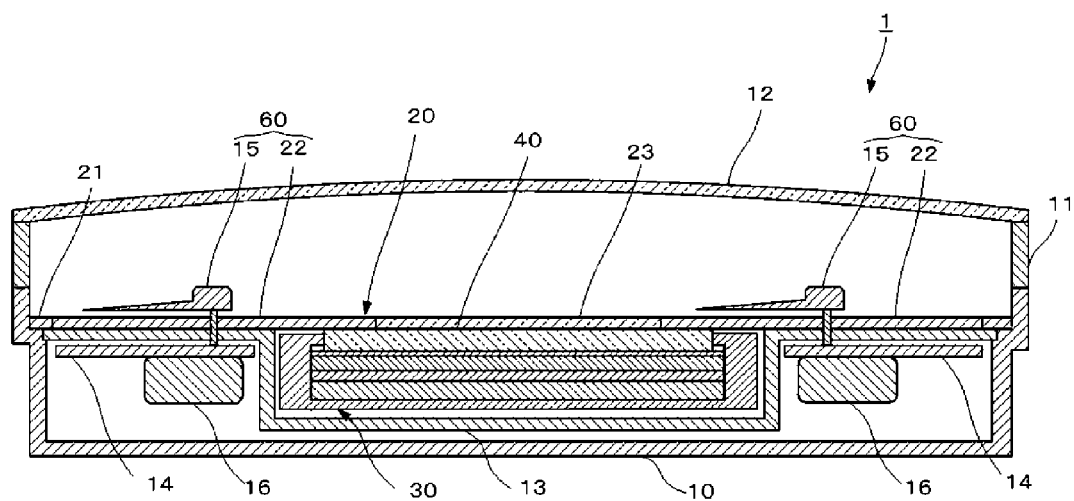
FIG. 2 is a sectional view of a display device according to a first embodiment of the invention indicated by an arrow II-II in FIG. 1.

Next, components of the display device 1 will be described in more detail. FIG. 2 is a sectional view of the display device 1 according to a first embodiment of the invention indicated by an arrow II-II in FIG. 1. As shown in the figure, the outer shape of the display device 1 is formed by combining a housing 10, a facing 11, and a transparent window 12, and a space is formed inside for housing various components.

The housing 10 being formed of molded resin such as polypropylene holds a circuit board 14 and an inner case 13 described later, and protects them from external shock and dust. The housing 10 may be provided with a through-hole for dissipating the heat generated from the circuit board 14 or the like when the display device 1 is driven.

The facing 11 being formed of molded resin such as polypropylene holds the transparent window 12 described later. The facing 11 suppresses sunlight from entering into the display device 1. This ensures the visibility and readability of the display device 1.

The transparent window 12 being formed of a molded resin such as polypropylene protects the members housed in the display device 1 from shock and dust. The transparent window 12 has a curved shape. This suppresses reflection of a driver's face. To enhance the visibility of the display device 1, the transparent window 12 may be provided with an anti-reflection layer on the surface. The transparent window 12 may be provided with an anti-scratch layer on the surface for improvement of the shock resistance.

Inside the display device 1 having the outer shape formed as described above, various components such as the inner case 13, the circuit board 14, the pointer 15, the cover plate 20, the display 30 and the likes are housed.

The inner case 13 is formed of molded resin such as polypropylene. The inner case 13 being held by the housing 10 holds the circuit board 14, the cover plate 20, and the likes described later.

The circuit board 14 is formed of epoxy resin, for example, and is equipped with a microcomputer for operating the display device 1, a pointer drive means 16 for driving the pointer 15 described later, and an illumination LED of the display device 1, and the likes. The circuit board 14 is provided with a copper foil pattern based on a predetermined electric circuit. The circuit board 14 may be mixed with a glass fiber to improve the reliability against temperature change and shock. The copper foil pattern of the circuit board 14 may be formed on both sides, or formed to have a hierarchical structure for space saving of circuit patterns.

The pointer 15 is formed of transparent molded resin such as polycarbonate and acrylic glass. The pointer 15 is fixed to the rotation axis of the pointer drive means 16 mounted on the circuit board 14. When the pointer drive means 16 drives, the pointer 15 rotates around the rotation axis. The pointer 15 rotates on the ring-shaped index display part 22 on which the index or the like is printed. Therefore a driver can read vehicle status by checking a position pointed by the pointer 15. The pointer 15 may be lit by an LED to be mounted on the circuit board 14. The pointer of the pointer 15 may be provided with a reflection layer by a hot stamp or the like to enhance the emission luminance.

The cover plate 20 is a plate member for covering the circuit board 14, the display 30, and the likes, and is based on a plate-shaped light-transmitting member formed from polycarbonate, for example. On the back or the surface of the plate-like light-transmitting member, a non-light-transmitting portion 21 not transmitting light and a ring-shaped index display part 22 having a printed scale, digit, warning display or the likes for displaying vehicle status and the likes (in this embodiment, this portion does not transmit light) are formed by an appropriate method such as screen printing or painting. The other non-printed regions function as a light-transmitting portion 23 that transmits light.

The display 30 comprises a TFT (thin film transistor), for example, and displays an image related to various information according to vehicle status and driving situation in a display part 30a (display region). Light related to an image is transmitted through the light-transmitting portion 23, providing information and warning to a driver. The display 30 is housed and fixed in a recess of the inner case 13. It does not matter whether the display 30 is a full color display or a monochrome display. An area size of the display part 30a is not particularly limited. The area size of the display part 30a is preferably 3 to 7 inches. In the embodiment, when viewing the display 30 or the display part 30a in plan (when viewed from the user, such as a driver), the shapes of the display 30 and the display part 30a are rectangular. The display 30 is not limited to a TFT module, and may be a segment-type liquid crystal display device or one using an organic light-emitting diode.

Figure 3:
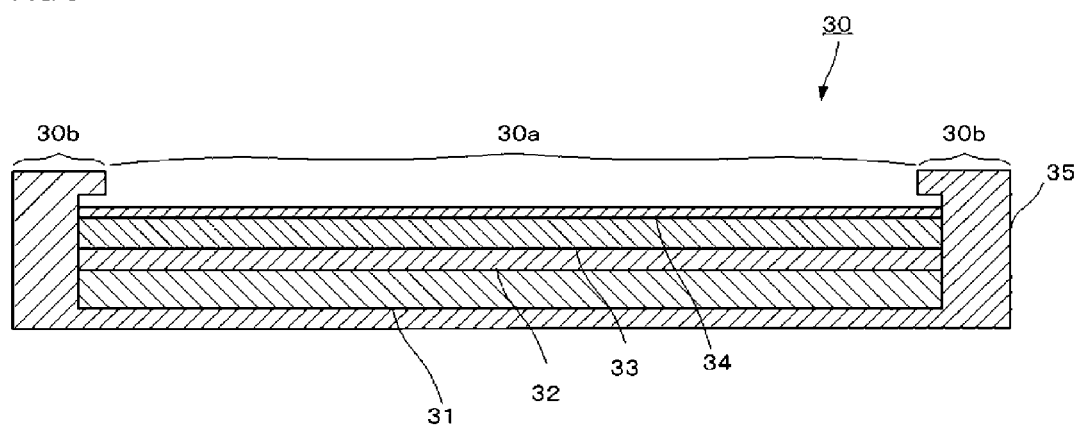
FIG. 3 is a sectional view showing a display of a display device according to a first embodiment of the invention.

FIG. 3 is a sectional view showing the display 30 of the display device 1 according to a first embodiment of the invention. As shown in the figure, the display 30 comprises a laminated body formed by laminating a light guide plate 31, an optical sheet 32, a liquid crystal array 33, and a polarizing plate 34 in this order from the lower side of the figure, and a metal bezel 35 covering the periphery of the laminated body. Thus, the display 30 has a display part 30a that emits light related to displayed content, and a non-display part 30b that is a periphery of the display part 30a and is covered by the metal bezel 35. The metal bezel 35 is connected to a GND (ground) of the circuit board 14 (FIG. 2). Therefore, even when a high voltage is applied from the front side of the display 30, damage to the display 30 is prevented. The metal bezel 35 is formed of an electrically galvanized steel sheet (SECC), for example. As a display device 1 mounted on a vehicle, from the viewpoint of durability against vibration, it is suitable to use a rigid module provided with a metal bezel 35. A TFT module of a type not having a metal bezel 35 may also be used.

In the display device 1 according to the first embodiment of the invention, as shown in FIG. 2, an optical transparent resin 40 lies between the cover plate 20 (light-transmitting portion 23) and the display 30. The optical transparent resin 40 is used to bond (closely contact) the cover plate 20 to the display 30. The optical transparent resin 40 may be formed by curing after solution of optical transparent adhesive is filled between the cover plate 20 and the display 30. An optical transparent sheet as an adhesive sheet may be used for the optical transparent resin 40. The polarizing plate 34 of the display 30 bonded to the optical transparent resin 40 is preferably subjected to surface treatment such as glare treatment, antireflection treatment, anti-scratch treatment, UV deterioration preventing process, and the likes.

Requirements for the optical transparent resin 40 are as follows. First, a refractive index is desired to be close to that of the light-transmitting portion 23 of the cover plate 20. This suppresses reflection of an external light incident from the light-transmitting portion 23 in the interface between the light-transmitting portion 23 and the optical transparent resin 40. Further, the optical transparent resin 40 desirably has a high transmissivity. This makes it possible to reduce brightness loss of the light emitted from the display 30. Further, it is required to have a linear expansion coefficient enough to absorb a deviation due to the difference between a linear expansion coefficient near the surface of the display 30 to be bonded (in the embodiment, the polarizing plate 34 and the glass substrate, or the like) and a linear expansion coefficient of a base material (e.g., polycarbonate, as described above). Furthermore, the optical transparent resin 40 is required to have a bonding force capable of securely bonding the cover plate 20 and the display 30. The optical transparent resin 40 may be colored in a dark smoke tone to suppress a transmissivity low. This makes it possible to balance the intensity of the light emitted from the light-transmitting portion 23 and that of the light emitted from the gauge section 60.

As described above, by interposing the optical transparent resin 40, it is possible to place a member having a refractive index close to that of the light-transmitting portion 23 between the cover plate 20 and the display 30 without an air layer. This enables to suppress reflection of external light on the surfaces of the light-transmitting portion 23 and the optical transparent resin 40. Therefore, it is possible to solve the problem that the display of the display 30 becomes difficult to see due to the reflection of external light.

As the sizes of the display 30 and the gauge section 60 increase, the visibility of them naturally increases. In the display device 1 according to the first embodiment of the invention, for disposing a display 30 that is larger and rectangular shape, as shown in FIGS. 1 and 2, a portion of the ring-shaped index display part 22, a component of the gauge section 60, is overlapped with the display 30. In such a configuration, it is possible to dispose a display 30 that is larger and rectangular shape, and as shown in FIG. 1, it is possible to display the displayed content in the region of four corners 23a of the light-transmitting portion 23. Thus, the region of the four corners 23a is not formed in the configuration that the gauge section 60 does not overlap with the ring-shaped index display part 22 (because, the display part 30a of the display 30 is limited to a rectangular shape). Since the region of the four corners 23a has been formed as described above, a devised display not boring to a driver becomes possible by displaying a polygonal shape in addition to a simple rectangular shape. Further, the display region itself can be taken larger (the display part 30a of the display 30 is limited to a rectangular shape), and the visibility of the displayed content of the display 30 can be increased.

Further, the cover plate 20 shown in FIG. 2 is planar with no irregularities on the surface. This provides a constant space between the surface of the display 30 and the light-transmitting portion 23 of the cover plate 20, and between the surface of the display 30 and the ring-shaped index display part 22. Therefore, it is possible to bond the cover plate 20 and the display 30 by the optical transparent resin 40 having a uniform thickness.

Further, as the cover plate 20 is a planar, there is no step between the light-transmitting portion 23 and the ring-shaped index display part 22. Therefore, it is possible to obscure the boundary between the display 30 and the cover plate 20, realizing an appearance with a sense of unity.

In the above description, an optical transparent sheet can be used for the optical transparent resin 40. However, from the viewpoint of the work efficiency, it is preferable to use a liquid optical transparent adhesive for the display 30 provided with the metal bezel 35 in order to fill the step due to the metal bezel 35. As such an optical transparent adhesive, there are a variety of types. From the viewpoint of the work efficiency, it is preferable to use a UV curable adhesive.

Figure 4:
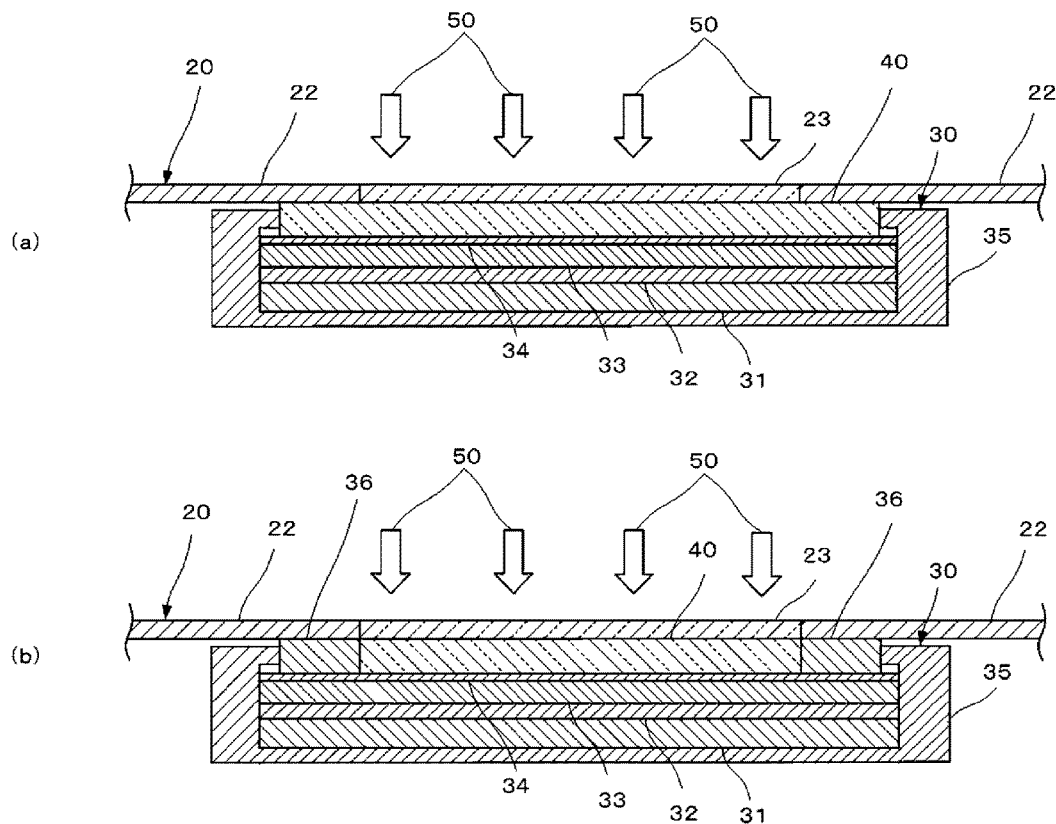
FIG. 4 is a sectional view showing two methods ((a) and (b)) for bonding a cover plate and a display of a display device according to a first embodiment of the invention.

Next, a description will be given of a method of bonding the cover plate 20 and the display 30. FIG. 4 is a sectional view showing two methods ((a) and (b)) for bonding the cover plate 20 and the display 30 of the display device 1 according to the first embodiment of the invention.

Figure 5:
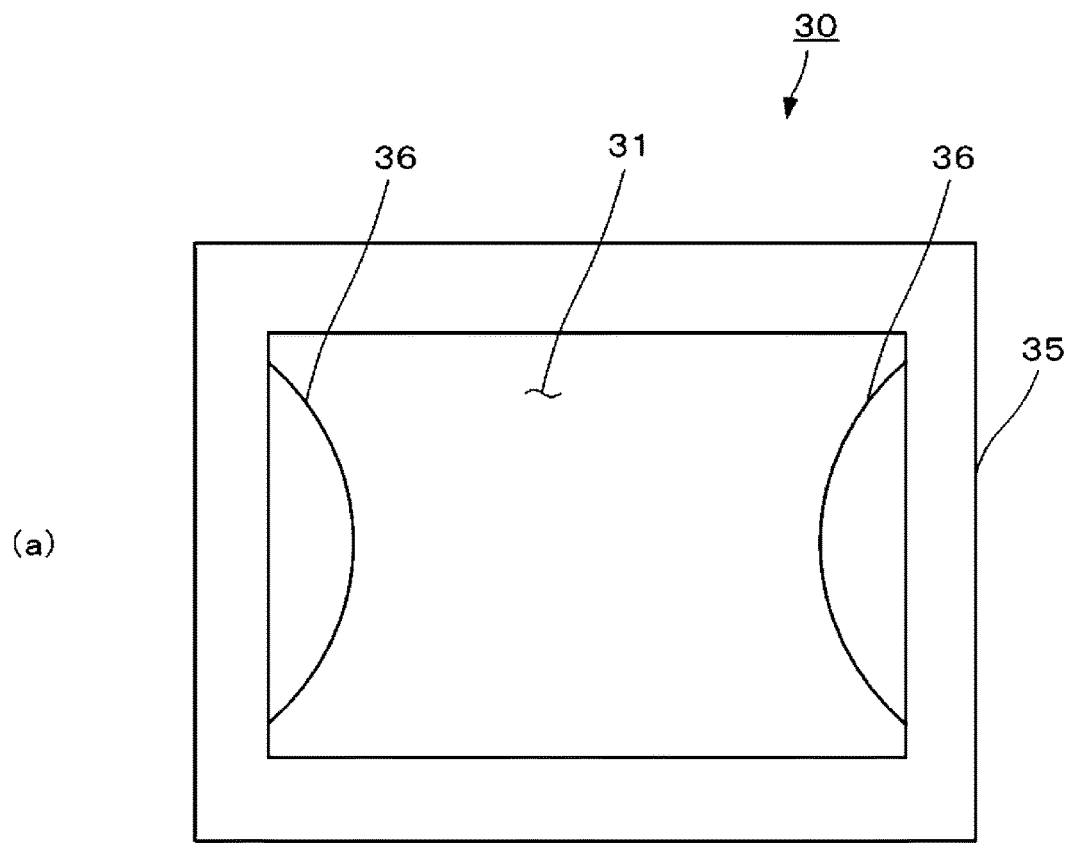
FIG. 5 shows another example of a display of a display device according to a first embodiment of the invention: (a) is a plan view, and (b) is a partial perspective view.
Figure 5:
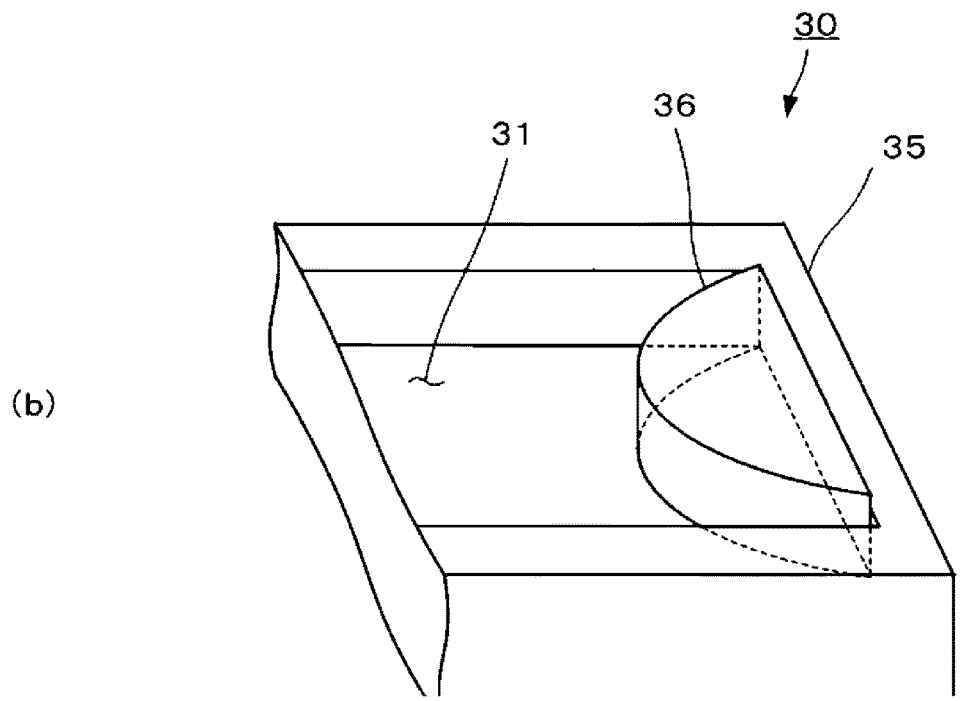

FIG. 5 shows another example of the display 30 of the display device 1 according to the first embodiment of the invention: (a) is a plan view, and (b) is a partial perspective view.

As shown in FIG. 4 (a), first, fill a UV curable adhesive as the optical transparent resin 40 to a clearance between the cover plate 20 and the display 30. Then, irradiate a UV light 50 to the UV curable adhesive through the light-transmitting portion 23 of the cover plate 20 to cure the UV curable adhesive. Thereby, the optical transparent resin 40 is formed, and the cover plate 20 and the display 30 bonded.

As described above, in the display device 1 according to the embodiment, a portion of the ring-shaped index display part 22 laps over the display 30. Thus, even when the UV light 50 is irradiated through the light-transmitting portion 23, the UV light 50 does not reach just below the ring-shaped index display part 22, and the UV curable adhesive may not be sufficiently cured. When such a situation is assumed, as shown in FIG. 4 (b), it is preferable to form a spacer 36 in a part where the display part 30a of the display 30 (FIG. 3) laps over the ring-shaped index display part 22 (hereinafter, referred to as an overlapping region), to prevent the adhesive from being filled in a range that the UV light 50 does not reach.

As shown in FIGS. 5 (a) and (b), in a plan view, the spacer 36 has a shape that matches the overlapping region, that is, a shape such as cutting out a part of a circle. The spacer 36 may be formed of ABS resin, molding resin such as polypropylene, or may be comprised of an electro-galvanized steel sheet (SECC) of the same material as the metal bezel 35. By forming the spacer 36 in the display 30 in such a manner, it is possible to prevent the optical transparent resin 40 from being insufficiently cured.

Figure 6:
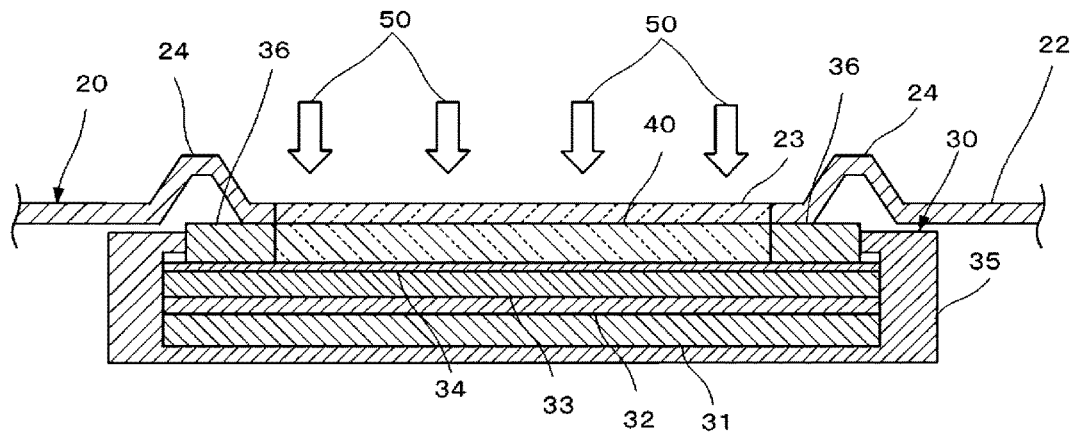
FIG. 6 is a sectional view showing another method for bonding a cover plate and a display of a display device according to a first embodiment of the invention.

FIG. 6 is a sectional view showing another method for bonding the cover plate 20 and the display 30 of the display device 1 according to the first embodiment of the invention. As shown in the figure, even when a ring portion 24 of the ring-shaped index display part 22 is molded three-dimensionally by a drawing process or the like, it is possible by providing the spacer 36 to prevent the optical transparent resin 40 from being insufficiently cured. Thus, even when the ring portion 24 is molded three-dimensionally, the other portions of the ring-shaped index display part 22 are located on the same plane as the light-transmitting portion 23. Therefore, it is possible to obscure the boundary between the display 30 and the cover plate 20, realizing an appearance with a sense of unity.

Figure 7:
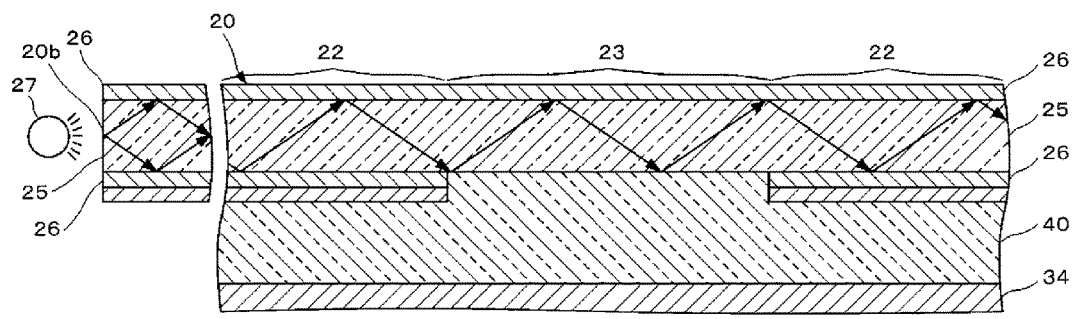
FIG. 7 is a partial sectional view of a display device according to a first embodiment of the invention, which uses a light guide index display part as a cover plate of a display device.

A light guide index display part may be used in the cover plate 20 of the display device 1 of the embodiment to enable to illuminate the content printed on the ring-shaped index display part 22. FIG. 7 is a partial sectional view of the display device 1 according to the first embodiment of the invention, which uses a light guide index display part as the cover plate 20 of the display device 1. The cover plate 20 has a light guide layer 25 and a reflection layer 26 formed on both sides of the light guide layer 25. The light guide layer 25 is formed of transparent resin such as polycarbonate or acrylic glass, and forms a light guide path as a light guide body. The reflection layer 26 is formed of a material having a refractive index lower than that of the light guide layer 25. The reflection layer 26 is formed, for example, by medium printing. An illumination light source 27 such as a predetermined LED is provided lateral to the cover plate 20 of the display device 1. Light from the light source is incident from a side 20b of the cover plate 20, and is guided by the light guide index display part (in the cover plate 20).

The light guide layer 25 is formed of a material having a refractive index larger than that of the optical transparent resin 40. By increasing the refractive index of the light guide layer 25 to larger than that of the optical transparent resin 40, as described above, light guided to the light guide layer 25 is, as shown in FIG. 7, reflected even in the light-transmitting portion 23 having no reflection layer 26. For example, when the refraction index of the polycarbonate forming the light guide layer 25 is 1.59, the refraction index of the optical transparent resin 40 is preferably about 1.45. By using the light guide index display part in the cover plate 20, as described above, when light from the illumination light source is incident on the light guide index display part, the light reflects through the light guide layer 25, and is able to illuminate the index printed in the ring-shaped index display part 22. In the ring-shaped index display part 22, a white portion that transmits light (a portion such as an index and a contour of the ring-shaped index display part 22) and a black portion that does not transmit light (portions other than the above) is formed by printing on a front surface of a plat-like member of the cover plate 20. Therefore, for example, when the ring-shaped index display part 22 is illuminated, it is possible to make the index and the contour noticeable by the portion that transmits light and the portion that does not transmit light. When the portion that transmits light is within the overlapping region, it is preferable to make the spacer light-shielding. As a result, the overlapping region is illuminated by the light emitted from the display part 30a, and it is possible to prevent a leakage of light from the portion that transmits light.

The index formed in the ring-shaped index display part 22 is not limited to a scale design by printing or the like. For example, a scale or the like may be expressed by arranging to penetrate the light guide layer 25 from the rear to the front of a hole opened on the surface of the ring-shaped index display part. In this specification, the front represents a direction to a driver side, and is used as a term representing upward in FIG. 2, for example. Similarly, a term backward is used as a term representing downward in FIG. 2, for example.

Figure 8:
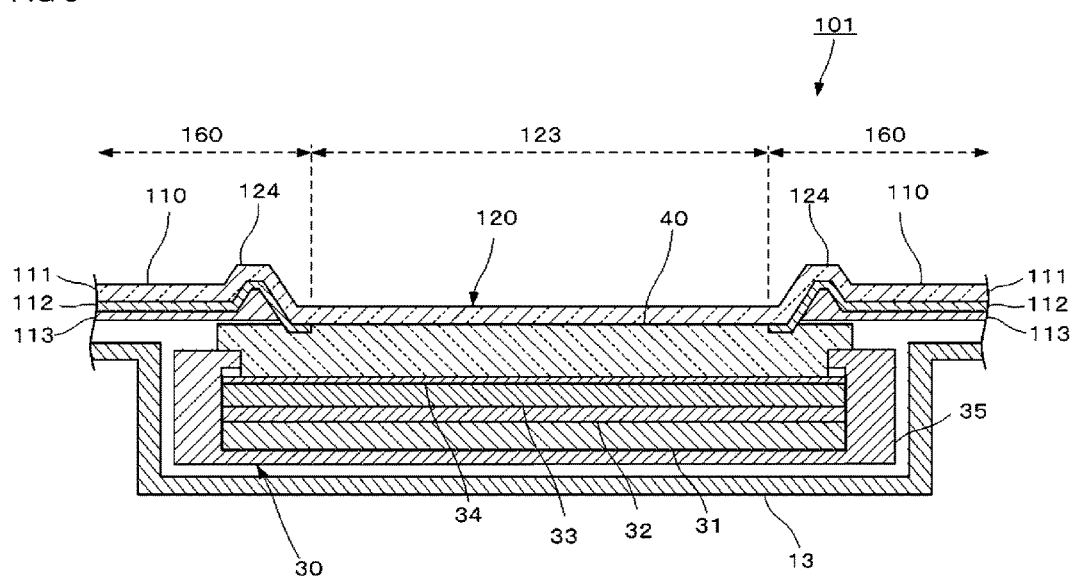
FIG. 8 is a partial sectional view showing a display device according to a second embodiment of the invention.

Next, a display device according to a second embodiment of the invention will be described. FIG. 8 is a partial sectional view showing a display device according to a second embodiment of the invention. The display device according to this embodiment has many points common to the display device according to the first embodiment described hereinbefore. Thus, in the following description, points different from the first embodiment will be mainly explained, and the like members are denoted by the like reference numerals.

As shown in FIG. 8, a cover plate 120 has a ring portion 124 that is a convex portion formed by a drawing process. By forming such a ring portion 124 so as to surround an index portion 110 having a printed scale, digits or the likes, it is possible to emphasize the region of the index portion 110. As a result, a display device 101 is given an excellent readability. The cover plate 120 is configured by forming a shielding layer 112 by screen printing or the like on a surface of a rear side of a base layer 111 formed of polycarbonate or the like having light transmissivity. The shielding layer 112 is formed by combining multicolor multi-layer printing, gradation printing and the likes. Similar to the light guide index display part described above, the shielding layer 112 has a printing layer comprising a white layer, for example, which transmits light and disables to view the inside of a display device 101, in a portion corresponding to a contour of an index and a gauge section 160, for example. The other portions have a printing layer comprising a black layer, for example, which can securely shield the light. Therefore, the index and the contour of the gauge section 160 are illuminated by the light guided by a light guide plate 113 described later, and the difference in brightness of the other regions becomes clear. As a result, a driver can securely view the content displayed in the gauge section 160. A portion of the cover plate 120 where the shielding layer 112 is not printed functions as a light-transmitting portion 123 that transmits the light emitted from the display 30. The shielding layer 112 may be formed on a front surface of the base layer 111.

On a surface in the rear of the index portion 110 and the ring portion 124 of the cover plate 120, a light guide plate 113 is disposed in being held by the inner case 13 or the cover plate 120. The light guide plate 113 is formed from a resin having transmissivity such as an acrylic glass, and guides a pre-arranged LED light for uniformly illuminating the index portion 110 and the ring portion 124 without unevenness. In the display device 101 according to the embodiment, the ring portion 124 of a convex shape is formed in the cover plate 120, and a space (a concave portion) is formed for housing the light guide plate 113 in the rear of the index portion 110 and the ring portion 124. The light guide plate 113 is housed in this space (the concave portion). Therefore, it is possible to position the rear surface of the light guide plate 113 to the forward of the rear side of the light-transmitting portion 123. Alternatively, these surfaces may be placed in the same position. In such a configuration, it is possible to arrange closely the display 30 and the cover plate 120, reducing the thickness of the optical transparent resin 40.

Further, in the display device 101 in the embodiment, the ring portion 124 is formed by drawing the cover plate 120. Therefore, it is possible to reduce the number of manufactured members, and manufacture the cover plate 120 at a low cost.

The optical transparent resin 40 spans, as shown in FIG. 8, a part of the gauge section 160 in addition to the light-transmitting portion 123, and bonds the cover plate 120 and the display 30. The thickness of the optical transparent resin 40 depends on the shapes of the display 30 and the cover plate 120, and is not uniformly determined. However, as a rough guide, when the display 30 has a non-display part 30b by the metal bezel 35 (FIG. 3), for example, the thickness of the optical transparent resin 40 is preferably 500 μm to 1500 μm. When the display 30 does not have a non-display part 30*b* (FIG. 3), the thickness of the optical transparent resin 40 is preferably 50 µm to 500 µm.

Further, the cover plate 120 in the embodiment has irregularities on the rear surface, unlike the cover plate 20 (FIG. 2) in the first embodiment. The front side of the display 30 also has irregularities. Thus, the optical transparent resin 40 for bonding the cover plate 120 and the display 30 is preferably formed of liquid adhesive. When using a liquid adhesive, apply the adhesive to one side or both sides of a bonding surface of the display 30 and the cover plate 120, and cure the adhesive after bonding. Such a liquid adhesive is preferably has a viscosity of about 2500 to 5000 mPa·s so as to form an optical transparent resin 40 having a certain thickness. Further, the adhesive should have the elasticity and adhesive force of the extent to prevent peeling and to absorb the deviation due to the difference in the linear expansion coefficients of the polarizing plate 34 and the cover plate 120, which are the surfaces bonded to the display 30, after being cured.

By filling a sealing material in a clearance between the display part 30*a* (FIG. 3) and the non-display part 30*b* (FIG. 3) of a display panel (a display 30), it is possible to prevent the liquid adhesive from flowing into the clearance. A sealing material may be applied along the outer circumference of the light-transmitting portion 123 of the cover plate 120. Such a sealing material preferably has a viscosity of about 15000 to 45000 mPa·s, and has the transmissivity and refractive index of the same level as those of the optical transparent resin 40. As a result, it is possible to obscure the boundary between the sealing material and the optical transparent resin 40.

Figure 9:
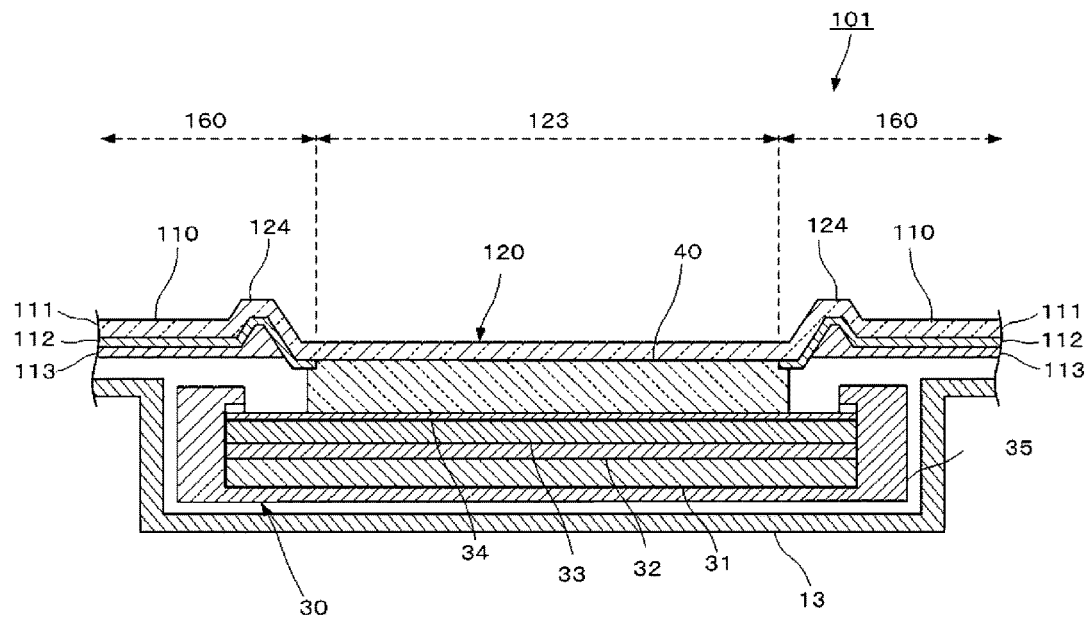
FIG. 9 is a partial sectional view showing another example of a display device according to a second embodiment of the invention.

FIG. 9 is a partial sectional view showing another example of the display device according to the second embodiment of the invention. As shown in FIG. 9, the range where the optical transparent resin 40 is provided is substantially the same as that of the light-transmitting portion 123 of the cover plate 120. Thus, when viewing the optical transparent resin 40 in plane, the shape is similar to the light-transmitting portion 123 of the cover plate 120, that is, the shape is similar to the light-transmitting portion 23 shown in FIG. 1. In this example, the spacer 36 shown in FIG. 4 may be provided between the display part of the display 30 and the gauge section 160. This makes it possible to prevent the optical transparent resin 40 from being insufficiently cured. A spacer having a light-shielding effect may be used. As a result, the overlapping area is illuminated by the light emitted from the display 30, and it is possible to prevent a leakage of the light from a portion that transmits light.

Figure 10:
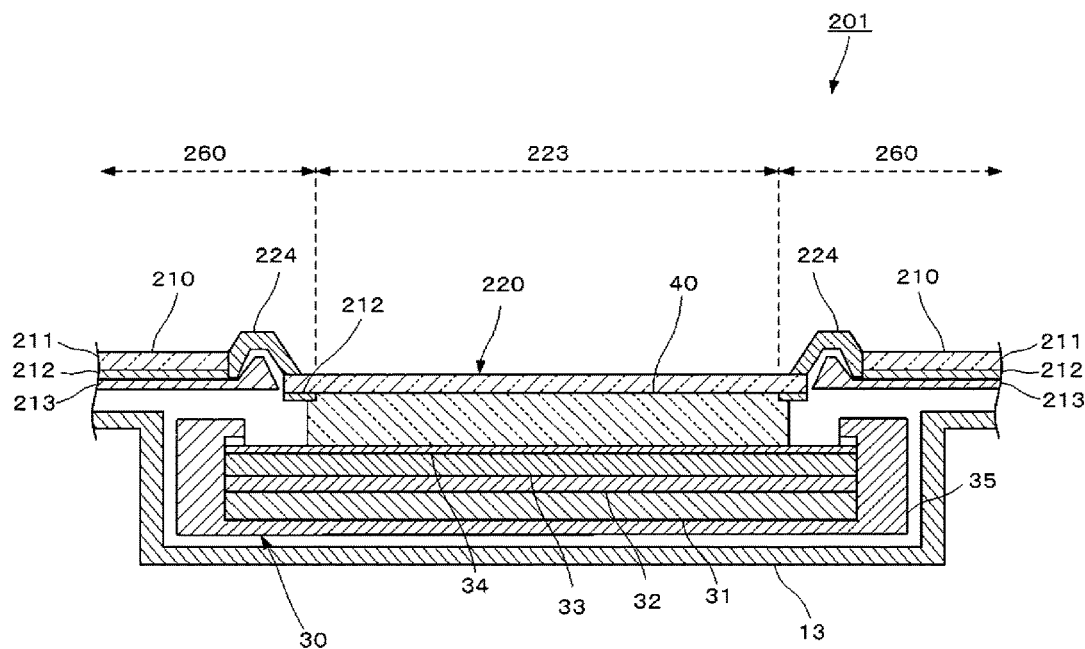
FIG. 10 is a partial sectional view showing a display device according to a third embodiment of the invention.

Next, a display device according to a third embodiment of the invention will be described. FIG. 10 is a partial sectional view showing a display device 201 according to a third embodiment of the invention. The cover plate 120 of the display device 101 according to the second embodiment described above has the ring portion 124 formed by a drawing process. On the other hand, a cover plate 220 itself of the display device 201 according to the third embodiment does not have a ring portion, and is combined with a ring portion 224 that is a separate member. By making the ring portion 224 a different member from the cover plate 220 in such a manner, even when the cover plate 220 is a material or has a thickness disabling a drawing process, it is possible to realize a display device 201 that achieves the similar effect as the second embodiment described above.

Having thus described several embodiments, the invention is not intended to be limited to the above embodiments, and various modifications are possible within the range shown in the claims. In other words, embodiments obtained by combining technical means appropriately modified within the range of the claims are also included in the technical scope of the present invention.

INDUSTRIAL APPLICABILITY

The present invention is applicable to a display device, in which a portion of a gauge section laps over (overlaps with) a display (a display region) when viewed in plan, and a display is located behind (directly below) a light-transmitting portion provided on a cover plate.

DESCRIPTION OF REFERENCE NUMERALS 1, 101, 201 Display device
10 Housing
11 Facing
12 Transparent window
13 Inner case
14 Circuit board
15 Pointer
16 Pointer drive means
20, 120, 220 Cover plate
20*b* Side
21 Non-light-transmitting portion
22 Ring-shaped index display part
22*a* Index
23, 123, 223 Light-transmitting portion
23*a* Four corners
24, 124, 224 Ring portion
25 Light guide layer
26 Reflection layer
27 Illumination light source
30 Display
30*a* Display part
30*b* Non-display part
31 Light guide plate
32 Optical sheet
33 Liquid crystal array
34 Polarizing plate
35 Metal bezel
36 Spacer
40 Optical transparent resin
50 UV light
60, 160, 260 Gauge section
110, 210 Index portion
111, 211 Base layer
112, 212 Shielding layer
113, 213 Light guide plate

The invention claimed is:
1. A display device, comprising:
a pointer;
a cover plate having a gauge section, on which an index pointed by the pointer is expressed, the gauge section configuring a pointer-type instrument together with the pointer and a light-transmitting portion that transmits light; and
a display, which is disposed behind the light-transmitting portion, and has a display region for display an image through the light-transmitting portion, wherein:
the gauge section has an overlapping region that laps over a part of the display region, when viewing in plan,
the light-transmitting portion and the display region of the display are in close contact through a transparent resin, a light-shielding spacer different from the transparent resin lies between the overlapping region and the display region of the display, and in a plan view, the light-shielding spacer which is formed of molding resin or metal has a shape of cutting out a part of a circle.

2. The display device according to claim 1, wherein at least a part of the overlapping region has a light-shielding property.

3. The display device according to claim 1, wherein:
the light-shielding spacer different from the transparent resin lies between the overlapping region and the display region of the display, and
the gauge section guides light incident from a side of the cover plate, and emits the light from a part of the gauge section.

4. The display device according to claim 3, wherein:
the light-shielding spacer different from the transparent resin lies between the overlapping region and the display region of the display,
a light guide plate having a light-transmitting property is disposed between the gauge section and the spacer, and
light guided by the light guide plate exits from a part of the gauge section.

5. The display device according to claim 4, wherein:
the gauge section has a ring portion that is formed three-dimensionally so as to surround the index,
the light guide plate is housed in a concave portion in the rear of the cover plate, which is generated by that the ring portion is formed.

6. The display device according to claim 5, wherein a rear surface of the light guide plate is located in the forward of a rear surface of the light-transmitting portion of the cover plate, or in the same position as a rear surface of the light-transmitting portion.

7. The display device according to claim 1, wherein:
the display region in the display is rectangular, and
the gauge section is substantially circular.

* * * * *